United States Patent Office 2,951,769
Patented Sept. 6, 1960

2,951,769
CHEMICAL PROCESS AND PRODUCT

William H. McKnight, Pittsburgh, Pa., assignor to Union Carbide Corporation, a corporation of New York No Drawing. Filed Oct. 19, 1956, Ser. No. 616,922

19 Claims. (Cl. 117—72)

The present invention relates to novel primer compositions and to a method of making the same. More particularly this invention concerns improved primers for vinyl resin coatings. Heretofore, the poor adhesion of vinyl chloride type resins, and particularly, plasticized vinyl chloride type resins, to smooth, hard, non-absorbent surfaces has limited considerably the scope of their usefulness.

Generally, any but the most highly polished surfaces would have enough surface roughness so that adequate adhesion could be obtained were it not for shrinkage forces in the films during the evaporation of solvents or thinners present in most coatings and/or their fusion into films on baking. These shrinkage forces tend to disrupt the mechanical connections of the film to the substrate, and thereby cause poor adhesion. In some instances, the mechanical adhesion can be restored by heating the dry film to soften and reflow it and permit the formation of new mechanical anchors. Usually, however, this is impractical because the high heat required degrades the resin excessively.

To remedy the above problem, various expedients have been employed. These include chemical modification of the resin itself. This is accomplished by the introduction of strong polar groups, for example, by the introduction of carboxyl groups into a vinyl resin polymer by copolymerization of a mixture of vinyl monomers with a carboxylic acid. A copolymer of a vinyl halide, vinyl acetate and vinyl alcohol has also been shown to have improved adhesive ability to certain surfaces by reason of the hydroxyl groups introduced into the resin by hydrolysis. It is, however, unduly expensive and time consuming to modify vinyl resins with suitable polar groupings for the purpose of increasing their adhesive ability, nor is the modified resin so obtained as effective as that produced by the practice of the present invention.

Adhesion has also been enhanced somewhat by formulating modifications, such as mixing the vinyl chloride polymer with compatible materials having excellent adhering properties.

Pigmentation also tends to improve adhesion by reducing overall volumetric shrinkage of the coating on drying and also because many pigments have, in themselves, some attractive forces for polar surfaces.

Formulation and pigmentation techniques have not, however, been adequate usually to insure good adhesion of vinyl chloride resins but are better adapted to enhance the adhesion developed by other means.

A further method employed heretofore for improving the adhesion of vinyl chloride type resins is through the use of special primary coating materials or primers. Thus, a primary coat or primer based on the adherent types of vinyl resins such as a vinyl chloride-vinyl acetate-vinyl maleic acid copolymer or a vinyl chloride-vinyl acetate-vinyl alcohol copolymer can be coated or finished with a copolymer which would ordinarily lack the adhesive quality necessary to be retained on the smooth, hard, non-absorbent base, and produce good overall adhesion. Certain non-vinyl primers have also been used, but their number is restricted by the limited compatibility of vinyl chloride type resins, and usually one film will not adhere to another if the resin components of the two films are incompatible. However, vinyl chloride polymers usually require large quantities of plasticizer in order to impart good flexibility thereto. When a film containing this quantity of plasticizer comes in contact with films of the adherent polymers, such as a vinyl chloride-vinyl acetate-maleic anhydride copolymer having a substantially lower intrinsic viscosity (in cyclohexanone at 20° C.) i.e. lower molecular weight, migration of the plasticizer occurs from the vinyl chloride polymer to the extent that the adherent lower molecular weight vinyl-maleic copolymer, that is a polymer of lower intrinsic viscosity, is made soft and cheesy and thus loses its adhesive quality. One obvious way to eliminate this problem would be to use a primer, or primary coat, which has been thermoset or otherwise rendered insoluble in the vinyl chloride plasticizers and solvents. This approach has been attempted. However, it has been observed that, when the primer is thermoset to the point that it is insoluble in the ester type plasticizers, the vinyl chloride type topcoat will no longer adhere to it. This effect results in the formulation of primers becoming quite critical and thus impractical for industrial use. This same difficulty was also encountered with non-vinyl primers; that is, when the primer was formulated to be relatively insoluble in the vinyl chloride plasticizers so that softening would not occur, the plasticized high polymer vinyl topcoats did not adhere.

By compromising between the degree of softening and adhesion, a primer coating composition may be arrived at which will function effectively for plasticized high polymer vinyl resins. Such a composition is one comprising 97 to 65 parts of a copolymer of maleic acid or maleic anhydride with a vinyl halide and a vinyl ester, for example, and 3 to 35 parts of phenol formaldehyde resin. However, such a composition, containing as it does, a major portion of a vinyl-maleic acid or anhydride copolymer has not proven satisfactory for plastisols and organosols due to excessive softening of the primer by the plasticizer present in the plasticized compositions, particularly where elevated temperatures are encountered.

According to the present invention, a primary or primer coating composition is provided which when applied to polished, hard, non-porous surfaces, such as glass, tin and aluminum sheet or steel, and baked thereon, will yield a strongly adhesive, thermally stable film to which vinyl chloride resin solutions and more particularly plastisol and organosol coating compositions are adhesive, and which will maintain this adhesion when subjected to steam sterilization temperatures up to approximately 250° F.

This primer composition comprises a blend of not less than one part by dry weight of a non-oil modified, heat-reactive, alkaline catalyzed phenol-formaldehyde resin and no more than one part by dry weight of a copolymer formed from vinyl chloride and maleic acid or its anhydride. Optionally, the copolymer can contain a vinyl carboxylate wherein the acyl group contains 2 to 8 carbon atoms.

The term "phenol-formaldehyde resin" as it is employed throughout this specification is intended to embrace those resins prepared using an alkaline catalyst such as, for example, ammonia, hexamethylene tetramine, sodium hydroxide or sodium carbonate from about 2 percent to 6 percent by weight based on the phenol. The molar ratio of phenol to formaldehyde will vary from about 0.75 to 1.4 and the phenol may be in part (up to about 20 percent by weight) replaced by a substituted phenol, such as for example, para cresol, para-tertiary butyl-phenol, para amyl phenol or para-phenyl phenol. The resulting heat-reactive resin is a hard, brittle substance soluble in ketone solvents, with a gel time of about 65 to 90 seconds at 150° C. It is preferably used as a 50 percent by weight solution in a ketone solvent.

The vinyl-maleic copolymer employed in the primer composition is formed from vinyl chloride and maleic acid or maleic anhydride. Optionally, and indeed preferably, a vinyl carboxylate can be included in which the acyl group contains 2 to 8 carbon atoms. Of these vinyl carboxylates, vinyl acetate has proven to be the most desirable. While the proportions are not narrowly critical in this regard, a major portion by weight of vinyl chloride relative to the vinyl carboxylate and maleic derivative is a requisite. The maleic acid or maleic acid anhydride member of the conjoint polymer is operative within the concept of the present invention when present therein in amounts of 0.5 to 5 percent by weight, with preferred limits in the range of 0.5 to 1 percent by weight. The copolymer which is most desirable in the practice of the present invention is one having the approximate composition:

| | Weight percent |
|---|---|
| Vinyl chloride | 85–88 |
| Vinyl acetate | 11.0–14.3 |
| Maleic acid (calculated as carboxyl) | 0.5–0.8 |

Further examples of these copolymers are disclosed in U.S. Patent 2,329,456. They are most effectively employed in a 20 percent by weight solution of ketone solvent and have preferably an intrinsic viscasity of 0.53 in cyclohexanone at 20° C., although those copolymers having an intrinsic viscosity in cyclohexanone of from 0.24 to 0.57 are completely operative within the scope of the present invention.

Suitable ketone solvents for the primer composition and the individual resin components thereof, are for example, acetone, methyl ethyl ketone, methyl isobutyl ketone, diisobutyl ketone, isophorone, methyl isophorone, nonanone, cyclohexanone, epoxyacetone and butoxy acetone. Other less preferred solvents are dioxane and nitro-paraffins such as 2-nitropropane and nitroethane. Various aromatic hydrocarbon diluents can also be employed, such as toluene, benzene, xylene and trimethyl benzene.

The two component mixtures, i.e. phenol formaldehyde resin and vinyl-maleic resins, are blended in the desired proportions, the preferred proportions being from five parts to one part of the phenol formaldehyde resin, and the operative range extending up to 12 parts of phenol formaldehyde resin, to one part of the vinyl-maleic resin. The terms "parts" and "percentages" unless otherwise indicated herein refer to parts and percentages by weight The blended solutions are somewhat cloudy and are preferably prepared just prior to the application, although they can be stored a week or more without changing appreciably. They can be applied for example, to tin-plate and baked for about ten minutes at 350° F. at the end of which time they yield a clear, thermally stable, baked coating. This is to be considered a minimum baking treatment, since lower temperatures or shorter times result in brittle, non-adherent films. Higher baking temperatures can be used, up to approximately 400° F. without detriment.

Where it is desired to bake at temperatures exceeding these limits, the addition of small amounts of suitable thermal stabilizer, such as those disclosed in U.S. Patent 2,208,216 and there applied to vinyl halide-vinyl ester copolymers, will serve. The added amounts of such stabilizer need not exceed 0.5 to 1.0 percent by weight of the total resinous solids.

As has been noted, the primer compositions of the present invention are of particular utility with regard to topcoats prepared from high polymer vinyl chloride resin plastisols and organosols. By the term "vinyl chloride resin plastisols" is meant those dispersions, preferably, of extremely small, essentially spherical ultimate particles of 0.1 to 20 microns ultimate diameter, that require at least 25 parts to 200 parts by weight of plasticizer to each 100 parts by weight of resin, to impart suitable flexibility thereto. Such resins are those having an intrinsic viscosity in cyclohexanone at 20° C. of at least about 1.25 or more. For example, vinyl chloride resins having an intrinsic viscosity of 1.52 in cyclohexanone at 20° C. are thoroughly operative. The term "vinyl chloride resin" employed herein is intended to encompass not only the vinyl chloride homopolymer but also copolymers of vinyl chloride with a vinyl carboxylate containing 2 to 8 carbon atoms in the acyl radical such as for example, vinyl propionate, vinyl butyrate, vinyl chloracetate, the vinyl ester of phenyl acetic acid and preferably vinyl acetate. The preferred operative relationship is one in which at least 50 parts by weight of vinyl chloride is present in the copolymer structure, an optimum proportion being about 80 parts or more by weight of vinyl chloride to 20 parts, also by weight, of vinyl carboxylate. Further examples of these resins are disclosed in U.S. Patent 2,068,424.

The term "vinyl chloride organosol" indicates a plastisol composition as described above to which a volatile non-aqueous liquid diluent and/or dispersant is added. The basic relationship of proportions between resin and plasticizer of the original plastisol composition is not affected. The amount of volatile ingredient need not be less than 3 percent or more than approximately 60 percent by weight of the total composition.

Suitable plasticizers for these vinyl chloride polymers are 2,2'-(2-ethylhexamide) diethyl di(2-ethylhexoate), polyethylene glycol di(2-ethylhexoate), triethylene glycol di-2-ethylhexoate, tri-(2-ethylhexyl) phosphate, dioctyl ester of dicarboxylic acid, di-2-ethylhexyl adipate, diethylene glycol dibenzoate, cresyl diphenyl phosphate, partially hydrogenated isomeric terphenyls and alkylated derivatives thereof, bis(dimethylbenzyl) carbonate, dioctyl sebacate, and polyesters and epoxided polyesters prepared from fatty acids with dibasic acids. Preferred as plasticizers, of course, are those compounds which are particularly resistant to the effects of high baking temperatures such as for example, di-(2-ethylhexyl) phthalate, di(2-amyl)phthalate, dibutyl phthalate, diethyl phthalate, di(n-hexyl) phthalate, butyl benzyl phthalate and the phthalates of mixed octanols.

The composition of the volatile liquid phase comprises a non-polar diluent and/or a polar dispersant. The dispersants employed are usually ketones and esters. Illustrative of the ketones are those solvents disclosed hereinabove for use with the primer composition. Typical esters which, in general, make the most desirable dispersants are ethyl acetate, amyl acetate and methyl acetate. Nitroparaffins, such as nitroethane and 2-nitropropane and ether-alcohols are also useful in this regard. The non-polar diluents are aliphatic and aromatic hydrocarbons such as, for example, benzene, toluene, xylene, heptane, octane and cyclohexane.

Where the organosol contains less than approximately 25 percent by weight of volatile ingredient; a diluent alone can be used. When, however, the amount of volatile component exceeds this quantity, a dispersant is usually required. A relationship by weight of 2 percent to 75 percent of dispersant to 75 percent to 98 percent diluent is then desirable.

While this invention is directed principally toward the utilization of unique primer compositions with vinyl chloride resin organosol and plastisol topcoat compositions, it is noted that these primer formulations can also be employed with topcoats of unplasticized vinyl chloride resin solutions wherein the resin need not have an intrinsic viscosity in cyclohexane at 20° C. of less than 0.24 or in excess of 1.25, and preferably, of approximately 0.53. These resins are dissolved in 15 percent to 25 percent, and preferably about 20 percent, by weight of the resin, of liquid solvent medium containing preferably at least 50 parts and up to 100 parts by weight of a ketone solvent. Where amounts of less than 100 parts of ketone solvent are employed, the remainder is an aromatic hydrocarbon diluent such as, for example, tolene, benzene, xylene and trimethyl benzene. Illustrative examples of suitable ketone solvents for use in these resin solutions are disclosed hereinabove for use with the primer compositions.

It is noted that the flexibility of the primer formulation is enhanced by the addition of small quantities of an epoxy resin such as for example, the polyglycidyl polyethers of dihydricphenols such as are disclosed in U.S. Patents 2,512,996 and 2,506,486. Such additions do not affect the basic relationship of the primer composition, i.e. not more than one part by dry weight of phenol formaldehyde resin to not less than one part by dry weight of vinyl-maleic resin. Useful formulations of primer containing an epoxy resin should not exceed 0.2 part by weight of the epoxy resin based on the amount of phenol formaldehyde resin present by weight therein, since amounts in excess of this result in incompatibility. Nor should the vinyl-maleic resin content in these same compositions be less than 0.1 part by weight relative to the phenol formaldehyde resin component, since poor adhesion results.

The invention is illustrated in greater detail in the following examples:

Example 1

A primary coating formulation containing by weight 50 parts of heat-reactive, non-oil modified phenol formaldehyde resin in 50 parts by weight of methyl ethyl ketone was blended with 110 parts by weight of a conjoint polymer of vinyl chloride, vinyl acetate and maleic acid anhydride as a 20 percent solution by weight in methyl isobutyl ketone. The blended solutions presented a cloudy appearance. The terms "parts" and "percentages" as employed throughout this specification refer to parts and percentages by weight.

The phenol formaldehyde resin employed was prepared by reacting, at 80° C. for about 1¼ hours, 100 parts (1 mole) natural phenol (80 phenol-20 cresol) with 61.6 parts (¾ mole) formaldehyde (37 percent) and 2.40 parts hexamethylene tetramine. The resulting resin is dehydrated to a residue temperature of 100-105° C. under 27″ vacuum and then discharged into pans and cooled to room temperature (25° C.). A sample of the resin, when heated at 150° C. for 70-90 sec., gelled to an infusible insoluble product.

This vinyl-maleic copolymer contained by weight 88 percent vinyl chloride, 0.8 percent modifying maleic acid anhydride and the remainder vinyl acetate.

To test the usefulness of this composition as a primer for plasticized vinyl resins, the resulting solution was applied to bare tinplate in about 0.3-0.5 mil film (dry) and baked for ten minutes at 350° F. A plastisol composition was cast at 15 mils thickness over replicate sets of this primer coated tinplate and baked at 350° F. for ten minutes, also, to effect fusion of the plastisol.

The plastisol composition was prepared from 100 parts of a vinyl chloride resin having an intrinsic viscosity in cyclohexane at 20° C. of 1.52, an ultimate particle diameter size of 0.7 to 1.0 micron range, mixed by stirring in a sigma blade or change-can mixer, with 30 parts 2-ethylhexyl diphenyl phosphate, 90 parts di(2-ethylhexyl) sebacate, 180 parts calcium carbonate and 5 parts titanium dioxide until a spreadable, pasty, finely divided suspension was obtained having a viscosity of about 5000 centipoises at 25° C.

To determine the adhesive ability of the primer formulation to the tinplate and the plastisol to the primer after this baking period had been completed, the samples were "knife tested." This test comprised scoring the coated tinplate sample with a knife and then evaluating the effort required to strip the primer from the plate or the plastisol from the primer. The test is performed on the dry film and also on a coated sample which has been immersed for one minute in water at 250° F. Adhesiveness both to tinplate and to primer was rated as excellent.

Example 2

A solution containing 50 parts by weight of phenol formaldehyde resin prepared as in Example 1, but using 80 parts of synthetic phenol-containing no cresol, 20 parts para-tertiary butyl phenol and 112 parts (1.38 mole) formaldehyde (37 percent) and 2.4 parts hexamethylene tetramine, and 25 parts by weight of vinyl chloride-vinyl acetate-maleic acid anhydride copolymer wherein the resin components (i.e. the phenolic resin and resin copolymer) were made in the same proportions and according to the same procedure as described in Example 1, were "knife tested" as described in this same example. The results recorded evidenced excellent adhesive ability for the primer with relation to the tinplate and of the plastisol relative to the primer.

Example 3

A solution of 50 parts by weight of heat-reactive phenol formaldehyde resin was prepared as described in Example 1, but using 80 parts synthetic phenol and 20 parts para-phenyl phenol. Cyclohexanone was substituted, however, for the solvent employed therein. This solution was blended with a solution of vinyl chloride-vinyl acetate-maleic acid anhydride copolymer dissolved in methyl isobutyl ketone, the proportions of components thereof being the same as that described in Example 1. To this resulting solution, 50 parts by weight of cyclohexanone was added.

Panels prepared and tested for adhesion in the same manner as in Example 1 gave excellent adhesion of the primer to the tinplate and of the plastisol to the primer, both before and after exposure to water at 250° F. under pressure.

Example 4

The primer was prepared exactly as in Example 3 and this was applied to tinplate panels as before. The following plastisol was cast at 15 mils thickness over replicate sets of primer coated tinplate (coated with the primer formulation of Example 1) and baked at 350° F. for 10 minutes.

| | Parts by weight |
|---|---|
| Polyvinyl chloride resin | 100 |
| Calcium carbonate | 180 |
| Titanium dioxide | 5 |
| 2-ethylhexyldiphenyl phosphate | 60 |
| Di(2-ethylhexyl) sebacate | 60 |

Replicate samples were knife tested both after baking and also after the further step of being immersed for one minute in water at 250° F. Even though this plastisol contains a stronger solvating plasticizer mixture i.e. a higher ratio of 2-ethylhexyl diphenyl phosphate, than that used in Examples 1 through 3, the adhesive bond between primer and metal and between primer and plastisol remained excellent, when "knife tested" as described in the preceding examples.

Example 5

A resin coating composed of a conjoint polymer having an intrinsic viscosity of 0.53 and containing by weight 87 percent of vinyl chloride and 13 percent vinyl acetate was applied from a 20 percent solution in methyl isobutyl ketone to a tinplate panel over the primer formulation described in Example 1 and over a test panel coated with a standard commercial beer can primer made from a blend of 100 pounds of p-phenyl phenol formaldehyde resin and 12.5 gallons of tung oil. After baking the films for twenty minutes at 290° F., the coated panels were soaked in water at 180° F. for thirty minutes. The vinyl chloride-vinyl acetate resin coating showed considerable blush and poor adhesion when applied to the commercial primer, but no blush and good adhesion over the primer formulation described in Example 1 above.

*Example 6*

An organosol, formulated as follows, was applied over the phenol formaldehyde, vinyl-maleic copolymer primer solution prepared, applied and baked on the tinplate as described in Example 1:

| | Parts by weight |
|---|---|
| Polyvinyl chloride | 50.0 |
| Dioxtyl phthalate | 5.0 |
| Diisobutyl ketone | 25.0 |
| Solvent naphtha | 25.0 |

After baking 10 minutes at 350° F. to fuse the organosol, excellent adhesion developed between primer and organosol film, and remained good after soaking for several days in water at 120° F. By contrast, this same organosol showed poor adhesion to metal or to a conventional baked thermosetting primer prepared from 100 pounds of p-phenyl phenol formaldehyde and 12.5 gallons of tung oil.

*Example 7*

A primary coating formulation was prepared containing by weight 50 parts of heat-reactive phenol formaldehyde resin in a 50 percent solution of methyl ethyl ketone blended with 30 parts of a vinyl chloride-vinyl acetate-maleic anhydride copolymer in a 20 percent solution of methyl isobutyl ketone to which was added 8 parts by weight of the diglycidyl diether of a dihydric phenol (Bakelite Epoxy Resin EKRA 2002) in a 50 percent weight solution of methyl ethyl ketone.

The phenol formaldehyde resin component of the primer formulation was prepared as described in Example 1 but using 80 parts synthetic phenol i.e. no cresol was present, and 20 parts para-phenyl phenol.

The vinyl-maleic resin component was the same as that employed in Example 1.

The epoxy resin was a condensation product obtained from the reaction of epichlorohydrin and bisphenol having a softening point of 145° F. to 170° F. as determined by the standard ball and ring test. It has the following structural formula with the average number of units in the brackets 2.5

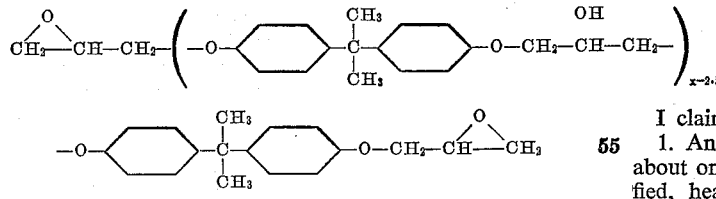

The resulting primer composition was mixed and the coating applied to the tinplate and baked ten minutes at 375° F. The product coating was then tested for adhesion with the vinyl chloride resin plastisol of Example 1. The adhesion measured after autoclaving at 250° F. to the tinplate and to the plastisol was excellent. The flexibility of the primer coat was improved as was the heat stability thereof by the epoxy resin addition.

*Example 8*

A primer formulation was prepared containing by weight 50 parts of heat-reactive phenol formaldehyde resin in a 50 percent solution of methyl ethyl ketone blended with 32 parts of vinyl chloride-vinyl acetate-maleic anhydride copolymer in a 20 percent solution of methyl isobutyl ketone to which was added 6 parts by weight of a polyglycidyl polyether of dihydric phenol (Bakelite Epoxy Resin EKRA 2003) in a 50 percent solution of methyl ethyl ketone. The blended solution presented a cloudy appearance.

The phenol formaldehyde resin and vinyl-maleic resin components of the primer formulation were the same as described in Example 7.

The epoxy resin used is a condensation product obtained as described in Example 7. The structural formula is also the same as described therein; the average number of units in the brackets thereof being 5 to 6. This higher epoxy polymer has a softening point as determined by the standard ball and ring test of 198° F. to 218° F.

The mixed resin solutions were applied to tinplate and baked 10 minutes at 375° F. and then tested as a primer coating for the plastisol as described in Example 1. The adhesion after autoclaving at 250° F. to the tinplate and to the plastisol was excellent. The flexibility of the primer coating was somewhat less than in the Example 7 using EKRA 2002 (softening point 145° F. to 170° F.), however, the heat stability was somewhat better.

*Example 9*

A primer formulation was prepared containing by weight 50 parts of heat-reactive phenol formaldehyde resin in a 50 percent solution of methyl ethyl ketone blended with 35 parts of vinyl chloride-vinyl acetate-maleic anhydride copolymer in a 20 percent solution of methyl isobutyl ketone to which was added 4 parts by weight of a polyglycidyl polyether of dihydric phenol (Shell Chemical Corporation Epon Resin 1007) in a 50 percent solution of methyl ethyl ketone. The blended solution presented a cloudy appearance.

The phenol formaldehyde resin and vinyl-maleic resin components of the primer formulation were the same as described in Example 7.

The epoxy resin used is a condensation product obtained as described in Example 7. The structural formula is the same as described therein; the average number of units in the brackets being approximately 11. This higher epoxy polymer has a softening point of 127° C. to 133° C. as determined by the standard Durran Mercury Method; each 1550 to 2000 grams of resin containing 1 gram equivalent of epoxide.

The mixed resin solutions were applied to tinplate and baked 10 minutes at 375° F. The coating was harder and not quite as flexible as the coating described in Example 8. When tested as described in this latter example the adhesion to the tinplate and primer coating was excellent.

I claim:

1. An adhesive primer composition comprising from about one to twelve parts by dry weight of non-oil modified, heat-reactive, alkaline-catalyzed, resinous reaction product of phenol and formaldehyde wherein the molar ratio of phenol to formaldehyde is from about 0.75:1 to about 1.4:1 and the phenol component contains no more than about 20% by weight of a substituted phenol and one part by dry weight of a copolymer of a maleic derivative selected from the group consisting of maleic acid and maleic anhydride, and a member selected from the group consisting of vinyl chloride and mixtures of vinyl chloride and a vinyl carboxylate, said copolymer containing a major portion by weight of vinyl chloride and 0.5 to 5 percent by weight of said maleic derivative polymerized therein, said primer composition being dissolved in an organic solvent.

2. An adhesive primer composition comprising from about one to twelve parts by dry weight of non-oil modified, heat-reactive, alkaline-catalyzed, resinous reaction product of phenol and formaldehyde wherein the molar ratio of phenol to formaldehyde is from about 0.75:1 to about 1.4:1 and the phenol component contains no more than about 20% by weight of a substituted phenol and one part by dry weight of a copolymer of vinyl chloride and a maleic derivative selected from the group consisting of maleic acid and maleic anhydride, said copolymer containing a major portion by weight of said vinyl chloride and 0.5 to 1 percent by weight of said maleic derivative polymerized therein, said primer composition being dissolved in a ketone solvent.

3. An adhesive primer composition comprising from about one to twelve parts by dry weight of non-oil modified, heat-reactive, alkaline-catalyzed, resinous reaction product of phenol and formaldehyde wherein the molar ratio of phenol to formaldehyde is from about 0.75:1 to about 1.4:1 and the phenol component contains no more than about 20% by weight of a substituted phenol and one part by dry weight of a copolymer of a maleic derivative selected from the group consisting of maleic acid and maleic anhydride, together with vinyl chloride and a vinyl carboxylate, the acyl portion of said vinyl carboxylate containing from 2 to 8 carbon atoms, and said copolymer containing a major portion by weight of said vinyl chloride and 0.5 to 1 percent by weight of said maleic derivative polymerized therein, said primer composition being dissolved in a ketone solvent.

4. An adhesive primer composition comprising from about one to twelve parts by dry weight of non-oil modified, heat-reactive, alkaline-catalyzed, resinous reaction product of phenol and formaldehyde wherein the molar ratio of phenol to formaldehyde is from about 0.75:1 to about 1.4:1 and the phenol component contains no more than about 20% by weight of a substituted phenol and one part by dry weight of a copolymer of a maleic derivative selected from the group consisting of maleic acid and maleic anhydride, together with vinyl chloride and vinyl acetate, said copolymer containing a major portion by weight of said vinyl chloride and 0.5 to 1 percent by weight of said maleic derivative polymerized therein, said primer composition being dissolved in a ketone solvent.

5. An adhesive primer composition comprising one part to five parts by dry weight of non-oil modified, heat reactive, alkaline-catalyzed, resinous reaction product of phenol and formaldehyde wherein the molar ratio of phenol to formaldehyde is from about 0.75:1 to about 1.4:1 and the phenol component contains no more than about 20% by weight of a substituted phenol, said resin being dissolved in a 50 percent by weight solution of ketone solvent and one part by dry weight of a copolymer, said copolymer containing 85 percent to 88 percent by weight of vinyl chloride, 11.0 percent to 14.3 percent by weight of vinyl acetate and 0.5 percent to 0.8 percent by weight of maleic acid polymerized therein, said copolymer being dissolved in a 20 percent by weight solution of ketone solvent, said composition presenting a cloudy dispersion in solution, and a clear thermally stable film after baking on a hard, non-absorbent surface for at least 10 minutes at 350° F. to 400° F.

6. An adhesive primer composition comprising from about one to twelve parts by dry weight of non-oil modified, heat-reactive, alkaline-catalyzed, resinous reaction product of phenol and formaldehyde wherein the molar ratio of phenol to formadlehyde is from about 0.75:1 to about 1.4:1 and the phenol component contains no more than about 20% by weight of a substituted phenol and one part by dry weight of a copolymer of a maleic derivative selected from the group consisting of maleic acid and maleic anhydride, and a member selected from the group consisting of vinyl chloride and mixtures of vinyl chloride and a vinyl carboxylate, said copolymer containing a major portion by weight of vinyl chloride and 0.5 to 5 percent by weight of said maleic derivative polymerized therein, and, in addition, no more than 0.2 parts of a polyglycidyl polyether of dihydricphenol by weight of said phenol-formaldehyde resin component, said primer composition being dissolved in an organic solvent.

7. A process of producing a coated article which comprises blending an adhesive primer composition composed of from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, and a member selected from the group consisting of vinyl chloride and mixtures of vinyl chloride and a vinyl carboxylate, said copolymer containing a major portion by weight of vinyl chloride and 0.5 to 5 percent by weight of said maleic derivative polymerized therein, said primer composition being dissolved in an organic solvent; coating a smooth, hard, non-absorbent material with said primer composition in the form of a cloudy dispersion, baking said coated material for at least 10 minutes at a temperature of at least 350° F. to form a clear thermally stable film of said primer composition thereon and depositing on said primer film a polymer selected from the group consisting of polyvinyl chloride and vinyl chloride-vinyl carboxylate copolymer, said vinyl chloride-vinyl carboxylate copolymer containing at least 50 percent by dry weight of polymerized vinyl chloride.

8. A process of producing a coated article which comprises blending an adhesive primer composition composed of from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, and a member selected from the group consisting of vinyl chloride and mixtures of vinyl chloride and a vinyl carboxylate, said copolymer containing a major portion by weight of vinyl chloride and 0.5 to 5 percent by weight of said maleic derivative polymerized therein, said primer composition being dissolved in an organic solvent; coating a smooth, hard, non-absorbent material with said primer composition in the form of a cloudy dispersion, baking said coated material for at least 10 minutes at a temperature of at least 350° F. to form a clear thermally stable film of said primer composition thereon and depositing on said primer film a non-aqueous liquid dispersion containing a finely divided polymer selected from the group consisting of polyvinyl chloride and vinyl chloride-vinyl carboxylate copolymer, said vinyl chloride-vinyl carboxylate copolymer containing at least 50 percent by weight of polymerized vinyl chloride.

9. A process of producing a coated article which comprises blending an adhesive thermally stable primer composition composed of from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, together with vinyl chloride and a vinyl carboxylate, said vinyl carboxylate containing from 2 to 8 carbon atoms in the acyl portion thereof, and said copolymer containing a major portion by weight of said vinyl chloride and 0.5 to 1 percent by weight of said maleic derivative polymerized therein, said primer composition being dissolved in a ketone solvent; coating a smooth, hard, non-absorbent material with said primer composition in the form of a cloudy dispersion, baking said coated material for at least 10 minutes at a temperature of at least 350° F. to form a clear thermally stable film of said primer thereon and depositing on said primer film a non-aqueous, liquid dispersion of finely divided polymer selected from the group consisting of polyvinyl chloride and vinyl chloride-vinyl acetate copolymer, said vinyl chloride-vinyl acetate copolymer containing at least 50 percent by dry weight of polymerized vinyl chloride.

10. A process of producing a coated article which comprises blending an adhesive thermally stable primer composition composed of from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, together with vinyl chloride and vinyl acetate, and said copolymer containing a major portion by weight of said vinyl chloride and 0.5 to 1 percent by weight of said maleic derivative polymerized therein, said primer composition being dissolved in a ketone solvent; coating a smooth, hard, non-absorbent material with said primer composition in the form of a cloudy dispersion, baking said coated material for at least 10 minutes at a temperature of from 350° F. to 400° F. to form a clear film of said primer composition thereon and depositing on said primer film a non-aqueous, liquid dispersion of a vinyl chloride-vinyl acetate copolymer, said vinyl chloride-vinyl acetate copolymer containing at least 50 percent by weight of polymerized vinyl chloride.

11. A process of producing a coated article which comprises blending an adhesive thermally stable primer composition composed of 5 parts to 1 part by dry weight of non-oil modified, heat-reactive, alkaline-catalyzed, resinous reaction product of phenol and formaldehyde, said resin being dissolved in 50 percent by weight solution of ketone solvent and 1 part by dry weight of a copolymer, said copolymer containing 85 percent to 88 percent by weight of vinyl chloride, 11.0 percent to 14.3 percent by weight of vinyl acetate and 0.5 percent to 0.8 percent by weight of maleic acid polymerized therein, said copolymer being dissolved in a 20 percent by weight solution of ketone solvent, said composition presenting a cloudy dispersion in solution and coating a smooth, hard, non-absorbent material with said primer composition, baking said coated material for at least 10 minutes at a temperature of from 350° F. to 400° F. to form a clear film of said primer composition thereon and depositing on said primer film a polymer selected from the group consisting of polyvinyl chloride and vinyl chloride-vinyl acetate copolymer, said vinyl chloride-vinyl acetate copolymer containing at least 50 percent by weight of polymerized vinyl chloride.

12. A process of producing a coated article which comprises blending an adhesive thermally stable primer composition composed of from about one to twelve parts by dry weight of a non-oil modified, heat-reactive, alkaline-catalyzed, resinous reaction product of phenol and formaldehyde and 1 part by dry weight of a copolymer of a maleic derivative selected from the group consisting of maleic acid and maleic anhydride, and a member selected from the group consisting of vinyl chloride and mixtures of vinyl chloride and a vinyl carboxylate, said copolymer containing a major portion by weight of vinyl chloride and 0.5 to 5 percent by weight of said maleic derivative polymerized therein, and, in addition no more than 0.2 part of a polyglycidyl polyether of a dihydric-phenol by weight of said phenol-formaldehyde resin component, said primer composition being dissolved in an organic solvent; coating a smooth, hard, non-absorbent material with said primer composition in the form of a cloudy dispersion, baking said coated material for at least 10 minutes at a temperature of at least 350° F. to form a clear film of said primer composition thereon and depositing on said primer film a non-aqueous, liquid dispersion containing a finely divided polymer selected from the group consisting of polyvinyl chloride and vinyl chloride-vinyl acetate copolymer, said vinyl chloride-vinyl acetate copolymer containing at least 50 percent by dry weight of polymerized vinyl chloride.

13. A smooth, hard, non-absorbent material and adhering to at least one surface thereof a clear, thermally stable, baked, adhesive primer composition comprising from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, and a member selected from the group consisting of vinyl chloride and mixtures of vinyl chloride and a vinyl carboxylate, said copolymer containing a major portion by weight of vinyl chloride and 0.5 to 5 percent by weight of said maleic derivative polymerized therein, and superimposed on said primer composition a polymer selected from the group consisting of polyvinyl chloride and vinyl chloride-vinyl acetate copolymer, said vinyl chloride-vinyl acetate copolymer containing at least 50 percent by weight of polymerized vinyl chloride.

14. A smooth, hard, non-absorbent material and adhering to at least one surface thereof a clear, thermally stable, baked, adhesive primer composition comprising from about one to twelve parts by dry weight of a non-oil modified, heat-reactive, alkaline catalyzed, resinous reaction product of phenol and formaldehyde with 1 part by dry weight of a copolymer of a maleic derivative selected from the group consisting of maleic acid and maleic anhydride, together with vinyl chloride and a vinyl carboxylate, said vinyl carboxylate containing from 2 to 8 carbon atoms in the acyl portion thereof, and said copolymer containing a major portion by weight of said vinyl chloride and 0.5 to 1 percent by weight of said maleic derivative polymerized therein, and superimposed on said primer composition a coating comprising a polymer selected from the group consisting of polyvinyl chloride and vinyl chloride-vinyl acetate copolymer, said vinyl chloride-vinyl acetate copolymer containing at least 50 percent by dry weight of polymerized vinyl chloride.

15. A smooth, hard, non-absorbent material and adhering to at least one surface thereof a clear, thermally stable, baked, adhesive primer composition comprising from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, together with vinyl chloride and a vinyl carboxylate, said vinyl carboxylate containing from 2 to 8 carbon atoms in the acyl portion thereof, and said copolymer containing a major portion by weight of said vinyl chloride and 0.5 to 1 percent by weight of said maleic derivative polymerized therein, and superimposed on said primer composition coating containing a polymer selected from the group consisting of polyvinyl chloride and vinyl chloride-vinyl acetate, copolymer, said vinyl chloride-vinyl acetate copolymer containing at least 50 percent by dry weight of polymerized vinyl chloride.

16. A smooth, hard, non-absorbent material and adhering to at least one surface thereof a clear, thermally stable, baked, adhesive primer composition comprising from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, together with vinyl chloride and a vinyl carboxylate, said vinyl carboxylate containing from 2 to 8 carbon atoms in the acyl portion thereof, and said copolymer containing a major portion by weight of said vinyl chloride and 0.5 to 1 percent by weight of said maleic derivative polymerized therein, and superimposed on said primer composition a coating containing a polymer selected from the group consisting of polyvinyl chloride and vinyl chloride-vinyl acetate copolymer, said vinyl chloride-vinyl acetate copolymer containing at least 50 percent by dry weight of polymerized vinyl chloride.

17. A smooth, hard, non-absorbent material and adhering to at least one surface thereof a clear, thermally stable, baked, adhesive primer composition comprising from about one to twelve parts by dry weight of a non-oil modified, heat reactive, alkaline-catalyzed, resinous reaction product of phenol and formaldehyde with 1 part by dry weight of a copolymer of a maleic derivative selected from the group consisting of maleic acid and maleic anhydride, together with vinyl chloride and vinyl acetate, said copolymer containing a major portion by weight of said vinyl chloride and 0.5 to 1 percent by weight of said maleic derivative polymerized therein, and superimposed on said primer composition a coating of a vinyl chloride-vinyl acetate copolymer, said vinyl chloride-vinyl acetate copolymer containing at least 50 percent by weight of polymerized vinyl chloride.

18. A smooth, hard, non-absorbent sheet material and adhering to at least one surface thereof a clear, thermally stable, baked, adhesive primer composition comprising 5 parts to 1 part by dry weight of non-oil modified, heat-reactive, alkaline-catalyzed, resinous reaction product of phenol and formaldehyde and 1 part by dry weight of a copolymer, said copolymer containing 85 percent to 88 percent by weight of vinyl chloride, 11.0 percent to 14.3 percent by weight of vinyl acetate and 0.5 percent to 0.8 percent by weight of maleic acid polymerized therein, and superimposed on said primer composition a coating containing a vinyl chloride-vinyl acetate copolymer, said vinyl chloride-vinyl acetate copolymer containing at least 50 percent by weight of polymerized vinyl chloride.

19. A smooth, hard, non-absorbent material and adhering to at least one surface thereof a clear, thermally stable, baked, adhesive primer composition comprising from about one to twelve parts by dry weight of a non-oil modified, heat-reactive, alkaline-catalyzed, resinous reaction product of phenol and formaldehyde with 1 part by dry weight of a copolymer of a maleic derivative selected from the group consisting of maleic acid and maleic anhydride, and a member selected from the group consisting of vinyl chloride and mixtures of vinyl chloride and a vinyl carboxylate, said copolymer containing a major portion by weight of vinyl chloride and 0.5 to 5 percent by weight of said maleic derivative polymerized therein and, in addition, no more than 0.2 part of a polyglycidyl polyether of a dihydricphenol by weight of said phenol-formaldehyde resin component, and superimposed on said primer composition a coating composed of a polymer selected from the group consiting of polyvinyl chloride and vinyl chloride-vinyl acetate copolymer containing at least 50 percent by weight of polymerized vinyl chloride.

References Cited in the file of this patent

UNITED STATES PATENTS

| | | |
|---|---|---|
| 2,270,662 | Raney | Jan. 20, 1942 |
| 2,390,198 | Voss | Dec. 4, 1945 |
| 2,403,077 | Hershberger | July 2, 1946 |
| 2,514,196 | Bradley | July 4, 1950 |
| 2,725,271 | Cunningham | Nov. 29, 1955 |
| 2,793,141 | Barr | May 21, 1957 |

FOREIGN PATENTS

| | | |
|---|---|---|
| 745,955 | Great Britain | Mar. 7, 1956 |

OTHER REFERENCES

Voss: Serial No. 394,890 (Alien Property Custodian), April 20, 1943.